(12) United States Patent
Herron et al.

(10) Patent No.: US 6,571,619 B2
(45) Date of Patent: Jun. 3, 2003

(54) REAL TIME PETROPHYSICAL EVALUATION SYSTEM

(75) Inventors: Michael M. Herron, Ridgefield, CT (US); Susan L. Herron, Ridgefield, CT (US)

(73) Assignee: Schlumberger Technology Corporation, Ridgefield, CT (US)

( * ) Notice: Subject to any disclaimer, the term of this patent is extended or adjusted under 35 U.S.C. 154(b) by 0 days.

(21) Appl. No.: 09/975,416

(22) Filed: Oct. 11, 2001

(65) Prior Publication Data

US 2003/0070480 A1 Apr. 17, 2003

(51) Int. Cl.$^7$ .......................... G01N 23/00; G01N 3/00; G01N 15/08
(52) U.S. Cl. .................. 73/152.14; 324/303; 702/13
(58) Field of Search ............... 73/152.02, 152.04, 73/152.05, 152.06, 152.08, 152.14; 324/303, 376; 702/11, 13

(56) References Cited

U.S. PATENT DOCUMENTS

| | | | |
|---|---|---|---|
| 4,584,874 A | 4/1986 | Ruhovets | 73/152 |
| 4,712,424 A | 12/1987 | Herron | 73/152 |
| 4,722,220 A | 2/1988 | Herron | 73/152 |
| 4,773,264 A | 9/1988 | Herron | 73/152 |
| 4,810,876 A | 3/1989 | Wraight et al. | 250/256 |
| 4,903,527 A | 2/1990 | Herron | 73/152 |
| 4,916,616 A | 4/1990 | Freedman et al. | 364/422 |
| 5,471,057 A | 11/1995 | Herron | 250/269.6 |
| 5,786,595 A | 7/1998 | Herron et al. | 250/256 |
| 6,140,816 A | 10/2000 | Herron | 324/303 |

FOREIGN PATENT DOCUMENTS

WO WO 01/22123 3/2001 ............ G01V/5/10

OTHER PUBLICATIONS

U. Ahmed et al. "Permeability Estimation: The Various Sources and Their Interrelationship".SPE 19604, (1989), pp. 649–662.

G. E. Archie. "The Electrical Resistivity Log as an Aid in Determining Some Reservoir Characteristics". AIME, 146, (1942), pp. 54–62.

C. Clavier et al. "The Theoretical and Experimental Bases for the 'Dual Water' Model for the Interpretation of Shaly Sands". SPE 6859, (1977), pp. 1–16.

C. Clavier et al. "Theoretical and Experimental Bases for the Dual–Water Model for Interpretation of Shaly Sands". SPE J, 24, (1984), pp. 153–167.

(List continued on next page.)

Primary Examiner—Daniel S. Larkin
Assistant Examiner—Jay L Politzer
(74) Attorney, Agent, or Firm—William B. Batzer; John J. Ryberg

(57) ABSTRACT

A subsurface formation petrophysical evaluation method including: determining formation porosity and permeability using a quantitative indication of formation composition; estimating water-filled formation resistivity using the formation porosity; associating differences between measured formation resistivity and estimated water saturated formation resistivity with the presence of subsurface hydrocarbons; and estimating irreducible formation water saturation using the formation porosity and the formation permeability. The invention further involves an apparatus adapted to carry out the inventive method. Other aspects of the invention involve making a plurality of different measurements of a subsurface formation, including measuring indicators of a plurality of absolute or relative formation elemental concentrations; processing the measurements to determine a plurality of parameters associated with the subsurface formation, and determining either net pay intervals or drilling parameters using these formation parameters and either interval acceptance criteria or desired wellbore criteria, respectively.

13 Claims, 5 Drawing Sheets

OTHER PUBLICATIONS

G. R. Coates et al. "The MRIL in Conoco 33 –1—an Investigation of a New Magnetic Resonance Imaging Log". SPWLA 32nd Annual Log. Symposium, (1991), Paper DD, pp. 1–23.

J. A. Grau et al. "Elemental Concentrations from Thermal Neutron Capture Gamma–ray Spectra in Geological Formulations". Nuclear Geophysics (1989), vol. 3, No. 1, pp. 1–9.

D. I. Gravestock. "Behavior of Waxman–Smits Parameter 'B' in High Rw, High Temperature Reservoirs". Log Analyst, 32(5), (1991), pp. 596–602.

S. L. Herron et al., "Quantitative Lithology: An Application for Open and Cased Hole Spectroscopy". SPWLA 37th Annual Logging Symposium (1996), Paper E, pp. 1–14.

M. M. Herron et al. "Log Interpretation Parameters Determined from Chemistry, Mineralogy and Nuclear Forward Modeling". Proceedings of the Int'l Symposium of the Society of Core Analysts 9727 (1997), pp. 1–12.

M. M. Herron et al. "A Robust Permeability Estimator for Siliciclastics". SPE 49301 (1998), pp. 1–11.

M. M. Herron et al. "Quantitative Lithology: Open and Cased Hole Application Derived from Integrated Core Chemistry and Mineralogy Data Base". Core–Log Integration (1998), No. 136, pp. 81–95.

S. L. Herron et al. "Application of Nuclear Spectroscopy Logs to the Derivation of Formation Matrix Density". SPWLA 41st Annual Logging Symposium (Jun. 2000), Paper JJ, pp. 1–12.

J. P. Horkowitz et al. "Complex Reservoir Evaluation in Open and Cased Wells". SPWLA 38th Annual Logging Symposium (1997), Paper W, pp. 1–14.

D. L. Johnson et al. "New Pore–Size Parameter Characterizing Transport in Porous Media". Phys. Rev. Lett., vol. 57, No. 20 (1986), pp. 2564–2567.

P. N. Sen et al. "Electrical Conduction in Clay Bearing Sandstones at High and Low Salinities". Journal of Applied Physics, vol. 63, No. 10 (1988), pp. 4832–4840.

A. Timur. "Producible Porosity and Permeability of Sandstones Investigated Through Nuclear Magnetic Resonance Principles". The Log Analyst, vol. 10, No. 1 (1969), pp. 3–11.

M. H. Waxman et al. "Electrical Conductivities in Oil Bearing Shaly Sands". SPE, 8, (1968), pp. V–145–V–160.

M. H. Waxman et al. "Electrical Conductivities in Shaly Sands– I. The Relation Between Hydrocarbon Saturation and Resistivity Index" J. Pet. Tech. Trans. AIME 257, (1974), pp. 213–218.

M. H. Waxman et al. "Electrical Conductivities in Shaly Sands– II. The Temperature Coefficient of Electrical Resistivity". J. Pet. Tech. Trans. AIME 257, (1974), pp. 218–255.

P. F. Worthington. "Evolution of Shaly Sand Concepts in Reservoir Evaluation". The Log Analyst, 26(1), (1985), pp. 23–40.

REAL TIME PETROPHYSICAL EVALUATION SYSTEM

FIELD OF THE INVENTION

This invention relates to the petrophysical evaluation of subsurface formations and more particularly to a subsurface formation petrophysical evaluation system that is capable of providing reliable and accurate petrophysical answers, such as porosity, permeability, and hydrocarbon/water saturation, soon after data acquisition, such as at the wellsite.

BACKGROUND

There is a long history of wanting to provide petrophysical answers (comprising at least porosity and hydrocarbon/water saturation) in "real time", which in the context of this application means soon after data collection, preferably at the wellsite. Past attempts to provide such a product have been plagued by the need to define numerous parameters and well zonations that would ordinarily need to be selected by a skilled interpreter. Due to the extensive time, effort, and expertise required, computed petrophysical evaluations are not currently performed for many wells. Reliable and accurate estimates of formation parameters could act as valuable starting points for wells where mineral model inversion will ultimately be used to compute reserves. Rapid petrophysical evaluation could also help oil and gas companies more quickly prioritize the wells and formations within those wells that appear to offer the best opportunities for improving return on investment. A real time petrophysical evaluation system implemented in a while drilling environment would also allow drilling parameters to be determined, such as changes to drilling direction and when to stop drilling.

For these reasons, it would be of great benefit to be able to provide a subsurface formation petrophysical evaluation system capable of providing reliable and accurate petrophysical answers, such as porosity, permeability, and hydrocarbon/water saturation, in real time, such as at the wellsite.

SUMMARY OF INVENTION

One aspect of the invention involves a subsurface formation petrophysical evaluation method including: determining formation porosity and permeability using a quantitative indication of formation composition; estimating water-filled formation resistivity using the formation porosity; associating differences between measured formation resistivity and estimated water-filled formation resistivity with the presence of subsurface hydrocarbons; and estimating irreducible formation water saturation (also called capillary bound water) using the formation porosity and the formation permeability. An apparatus adapted to carry out the inventive method is also described. Other aspects of the invention involve making a plurality of different measurements of a subsurface formation, including indicators of a plurality of absolute or relative formation elemental concentrations; processing the measurements to determine a plurality of parameters associated with the subsurface formation, and determining either net pay intervals or drilling parameters using these formation parameters. Further details and features of the invention will become more readily apparent from the detailed description that follows.

BRIEF DESCRIPTION OF FIGURES

The invention will be described in more detail below in conjunction with the following Figures, in which.

DETAILED DESCRIPTION

Figure 1:
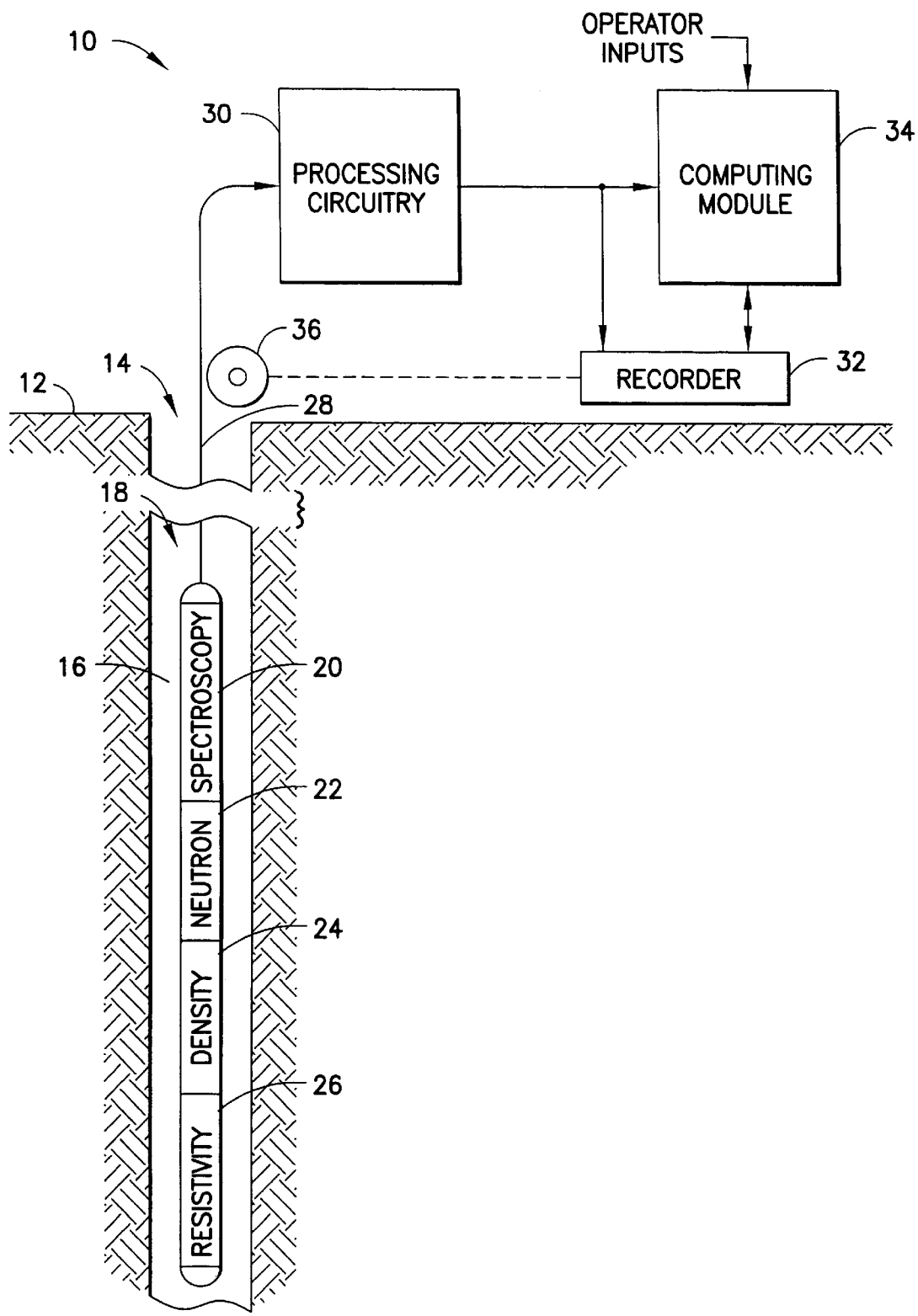
FIG. 1 schematically represents a subsurface formation well logging apparatus accordance with certain embodiments of the invention.

FIG. 1 shows an apparatus adapted to petrophysically evaluate a subsurface formation in accordance with certain embodiments of the invention. An acquisition and processing system 10 is shown deployed within a subsurface formation 12. A borehole 14 has been drilled within the subsurface formation 12 and is filled with a drilling fluid 16. A logging tool 18 is suspended in the borehole 14 on an armored cable 28, the deployed length of which substantially determines the depth of the logging tool within the subsurface formation 12. The cable length is controlled by conventional means at the surface (not shown). In this particular embodiment of the inventive apparatus, logging tool 18 includes a spectroscopy device 20, a neutron device 22, a density device 24, and a resistivity device 26. The spectroscopy device may be, for instance, Schlumberger's ECS™ tool and the neutron device 22, density device 24, and resistivity device 26 may be components of Schlumberger's PLATFORM EXPRESS™ "triple combo" tool. The spectroscopy device 20 provides a quantitative indication of formation composition by measuring absolute or relative elemental concentrations of a plurality of elements, such as silicon, calcium, iron, and sulfur. These elemental concentrations may also be used to estimate absolute or relative weight fractions of lithological materials such as clay, sandstone, carbonates, and pyrite. The resistivity device 26, may utilize, for instance, laterolog or inductive resistivity measurement principles. An additional device, not shown, may be used to determine the temperature profile of the formation. Circuitry 30, shown at the surface, although portions thereof may be located downhole, represents processing circuitry for the various components of logging tool 18. A sheave wheel 36 can be provided to determine the depth of the logging tool 18, and signals therefrom are typically coupled with a recorder 32, which represents electrical, magnetic, optical, graphical, and/or other storage and recording techniques performed on signals received from the processing circuitry 30 and computing module 34.

Figure 2:
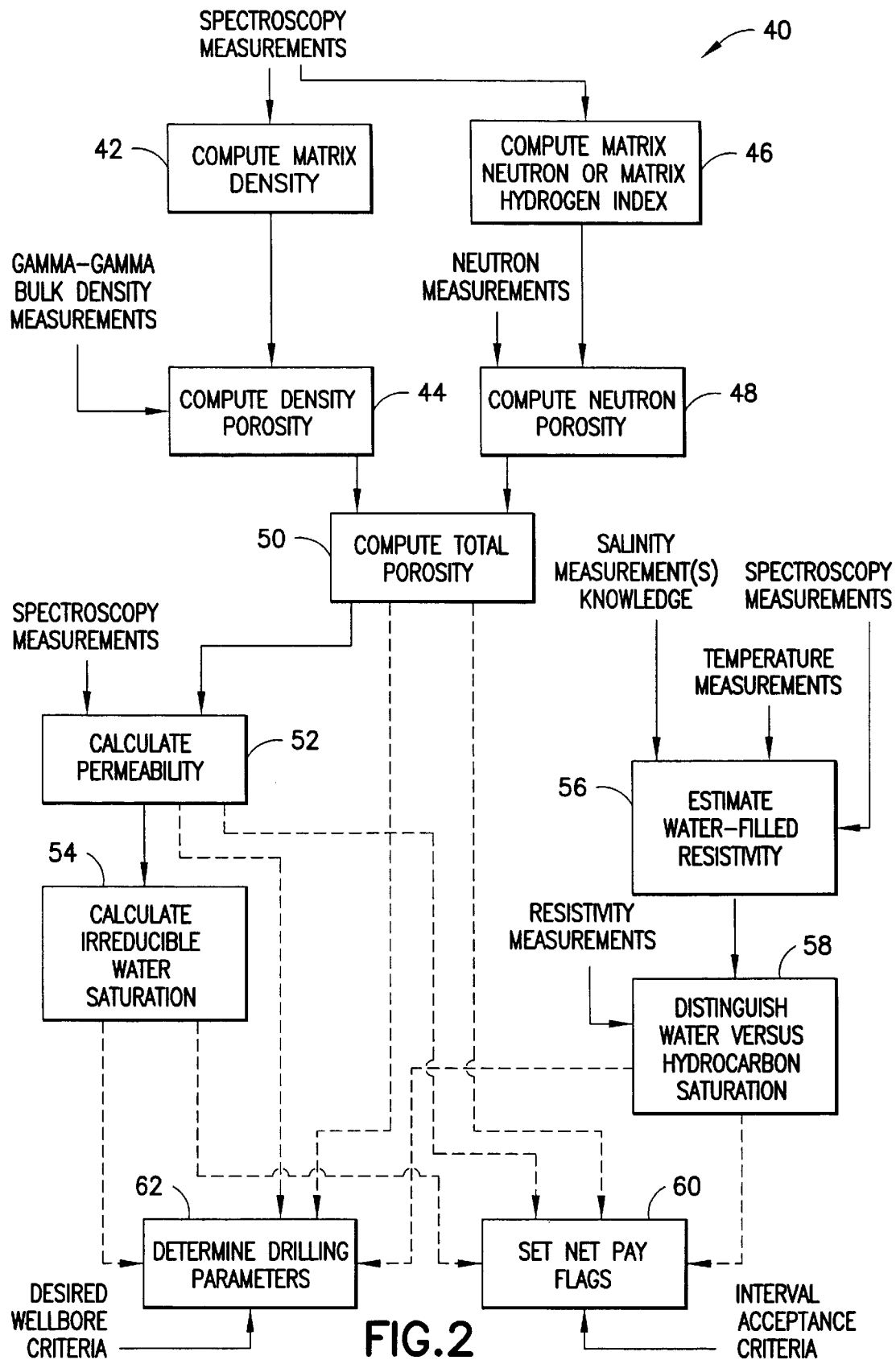
FIG. 2 schematically illustrates data flow and process steps in accordance with certain embodiments of the inventive method.

The operations performed within the computing module 34 in certain embodiments of the invention are illustrated as Computation Procedure 40 in FIG. 2.

Gamma-gamma bulk density measurements (output from the density device 24 discussed above) are typically converted to "density porosity" values during or soon after logging. The equation relating bulk density and porosity is $$\emptyset_t = \frac{\rho_{ma} - \rho_b}{\rho_{ma} - \rho_f}, \tag{1}$$

where $\emptyset_t$ is the total porosity, $\rho_b$ is the bulk density, $\rho_{ma}$ is the matrix density, and $\rho_f$ is the fluid density. Since $\rho_b$ is measured and $\rho_f$ is generally well known (it is typically assumed to be the density of the mud filtrate), the largest contributor to uncertainty in the calculation of porosity is $\rho_{ma}$. Typically, this parameter is unknown and a default constant such as 2.65 g cm$^{-3}$, the density of quartz, is used for field data processing and display.

In a different interpretation paradigm called Direct Computation of Matrix Properties (discussed in more detail in Herron, S. L. and Herron, M. M., 2000, Application of nuclear spectroscopy logs to the derivation of formation matrix density, Trans. SPWLA 41st Ann. Log. Symp., Dallas, Tex., Paper JJ, incorporated by reference), the matrix density can be approximated as a linear combination of the formation elemental fractions of silicon, calcium, iron and sulfur with a standard error of only 0.015 g cm$^{-3}$ according to the relationship:

$$\rho_{ma}=2.620+0.0490DWSI+0.2274DWCA+1.993DWFE+1.193DWSU, \quad (2)$$

where DWSI, DWCA, DWFE, and DWSU are weight fractions of the elements silicon, calcium, iron, and sulfur from spectroscopy measurements. In a pure quartz, substituting a value of 0.47 for DWSI produces a matrix density of 2.65 g cm$^{-3}$; in a pure limestone, substituting a value of 0.4 for DWCA gives a value of 2.71 g cm$^{-3}$. This process permits one to correct for lithology-based changes in matrix density immediately, obviating the need for subsequent mineral modeling. This procedure is depicted in FIG. 2 as Compute Matrix Density Process 42.

The computed matrix density values are combined with the gamma-gamma bulk density measurements in the Compute Density Porosity Process 44 to produce corrected density porosity values.

A similar approach is taken to compute corrected neutron porosity values. In the Compute Matrix Neutron or Matrix Hydrogen Index Process 46, matrix neutron values or matrix hydrogen index values (depending on the type of neutron measurements being made) are computed, again typically from formation elemental weight fractions. The following algorithms have been used to compute appropriate matrix neutron and matrix hydrogen index values:

$$\text{matrix neutron}=0.40816-0.889DWSI-1.0136DWCA-0.25718DWFE+0.67533DWSU$$

$$\text{matrix hydrogen index}=0.30155-0.6229DWSI-0.75759DWCA-0.47354DWFE+0.4521DWSU$$

where DWSI is the silicon concentration in weight percent, expressed as a decimal, DWCA is the calcium concentration, DWFE is the iron concentration, and DWSU is the sulfur concentration from spectroscopy measurements. These computed matrix neutron or matrix hydrogen index values are then similarly combined with the neutron measurements to produce corrected neutron porosity values in the Compute Neutron Porosity Process 48.

The corrected density porosity values and corrected neutron porosity values are then used to produce corrected total porosity values in the Compute Total Porosity Process 50. The preferred method for producing the corrected total porosity values is to select the corrected density porosity values in the absence of neutron/density cross-over and to average the corrected neutron and density porosity values in the presence of neutron/density cross-over. This process is graphically depicted in FIG. 3 and is discussed in more detail below.

The elemental concentration logs of silicon, calcium, iron, and sulfur can also be used to determine the quantitative lithology of the formation. This interpretation methodology, developed at Schlumberger and called SPECTROLITH™, was developed using a siliciclastic core database of mineralogy and chemistry measured on approximately 400 samples. The SPECTROLITH™ approach uses the elements silicon, calcium, and iron to estimate clay according to equation 3:

$$\text{Clay}=1.91(100-213.9DWSI-249.7DWCA-199DWFE), \quad (3)$$

where DWSI, DWCA, and DWFE are weight fractions of the elements silicon, calcium, and iron. Carbonates concentrations (combining calcite and dolomite) are determined from calcium. Anhydrite or pyrite concentrations are determined using the sulfur log. The remainder of the formation is composed of sand (quartz, feldspar, and mica minerals).

This process, including various alternatives thereto, is described in substantially more detail in the following documents and commonly-assigned U.S. Patents, each of which are incorporated by reference:

Grau, J. A., and Schweitzer, J. S., 1989, Elemental Concentrations from Thermal Neutron Capture Gamma-ray Spectra in Geological Formations; Nuclear Geophysics; Vol. 3, No. 1, pp. 1–9;

Herron, S. L. and Herron, M. M., 1996, Quantitative lithology: An application for open and cased hole spectroscopy, Trans. SPWLA 37th Ann. Log. Symp., New Orleans, La., Paper E;

Herron, M. M. and Herron, S. L., 1997, Log interpretation parameters determined from chemistry, mineralogy and nuclear forward modeling, Proc. 1997 Int. Symp. Soc. Core Anal., Calgary, 7–10 Sep., SCA-9727, 12 p.;

Horkowitz, J. P. and Cannon, D. E., 1997, Complex reservoir evaluation in open and cased wells, Trans. SPWLA 38$^{th}$ Ann. Log. Symp., Dallas, Tex., Paper W;

Herron, M. M. and Herron, S. L. (1998) "Quantitative lithology: open and cased hole applications derived from integrated core chemistry and mineralogy data base," in: Harvey, P. K. & Lovell, M. A. (eds) Core-Log Integration, Geological Society Special Publication No 136, pp. 81–95;

U.S. Pat. No. 4,712,424; entitled "Quantitative determination by elemental logging of subsurface formation properties", issued Dec. 15, 1987 to Michael M. Herron;

U.S. Pat. No. 4,722,220; entitled "Quantitative determination by elemental logging of subsurface formation properties", issued Feb.2, 1988 to Michael M. Herron;

U.S. Pat. No. 4,810,876; entitled "Logging apparatus and method for determining absolute elemental concentrations of subsurface formations", issued Mar. 7, 1989 to Peter D. Wraight et al.;

U.S. Pat. No. 4,903,527; entitled "Quantitative clay typing and lithological evaluation of subsurface formations", issued Feb. 27, 1990 to Michael M. Herron;

U.S. Pat. No. 5,471,057; entitled "Method and apparatus for determining elemental concentrations for γ-ray spectroscopy tools", issued Nov. 28, 1995 to Susan L. Herron; and U.S. Pat. No. 5,786,595; entitled "Method for estimating lithological fractions using spectroscopy measurements", issued Jul. 28, 1998 to Susan L. Herron and Michael M. Herron.

The formation permeability may be determined using these formation fractional lithology values and the corrected total porosity values (discussed above) in the Calculate Permeability Process 52. This process computes permeability in siliciclastic and related formations based on the Lambda parameter. The Lambda parameter is a measure of the effective diameter of dynamically connected pores and, in the simplest pore geometries, can be approximated from the surface to pore volume ratio. It has been shown that the surface to pore volume data could be computed from mineralogy data or from lithology concentrations. The other required input data are the total porosity, the matrix density, and Archie's cementation exponent, m. In more complex pore systems at lower permeability, some of the pores begin to be ineffective in flow and the initially predicted permeabilities are too high but can be accurately lowered. The k-Lambda initial estimate applied to lithology data is:

$$k_\Lambda = \frac{Z\emptyset^{m^*+2}}{(1-\emptyset)^2(\rho_g)^2(6wcla + 0.22wsan + 2wcar + 0.1wpyr)^2}, \quad (4)$$

where Z is an optimized prefactor, Ø is total porosity, m* is Archie's cementation exponent, $\rho_g$ is the calculated matrix density, and wcla, wsan, wcar, and wpyr are lithology weight fractions of clay, sandstone (quartz, feldspar, and mica), carbonates, and pyrite, respectively. If the initial estimate is less than 100 mD, the final estimate is computed using equation 5:

$$k_\Lambda = 0.037325 k_\Lambda^{1.714}. \quad (5)$$

The process of determining permeability of au earth formation using mineralogy data or from lithology concentrations is discussed in substantially more detail in the following references and commonly-assigned U.S. Patents, each of which are incorporated by reference:

Johnson, D. L., Koplik, J. and Schwartz, L. M., 1986, New pore-size parameter characterizing transport in porous media, Phys. Rev. Lett, 57, 2564–2567;

Sen, P. N., Goode, P. A. and Sibbit, A., 1988, Electrical conduction in clay bearing sandstones at high and low salinities, J. Appl. Phys., 63, 4832–4840;

Herron, M. M., Johnson, D. L. and Schwartz, L. M., 1998, A robust permeability estimator for siliciclastics, SPE 49301;

U.S. Pat. No. 4,773,264; entitled "Permeability determinations through the logging of subsurface formation properties", issued Sep. 27, 1988 to Michael M. Herron; and U.S. Pat. No. 6,140,816; entitled "Method of determining the permeability of sedimentary strata", issued Oct. 31, 2000 to Michael M. Herron.

A further process in Computation Procedure 40 is the Calculate Irreducible Water Saturation Process 54. The irreducible water saturation (also referred to as capillary bound water saturation) is the water in the formation that will remain if fluid is withdrawn from the rock matrix. By combining the estimate of permeability derived above with the corrected total porosity, an estimate of irreducible water saturation, BFV, can be obtained using the Coates-Timur-Lambda relation (6).

$$S_{wirr} = \frac{BFV}{\emptyset} = \frac{100\emptyset^2}{100\emptyset^2 + \sqrt{k_\Lambda}}. \quad (6)$$

Substantially more detailed discussions regarding the Coates-Timur equation can be found in:

Timur, A., 1969, Producible porosity and permeability of sandstones investigated through NMR principles, Log Analyst, 10(1), 3–11;

Ahmed, U., Crary, S. F. and Coates, G. R., 1989, Permeability estimation: the various sources and their interrelationship, SPE 19604; and Coates, G. R., Miller, M., Gillen, M. and Henderson, G., 1991, The MRIL in Conoco 33-1—an investigation of a new magnetic resonance imaging log, Trans. SPWLA 32th Ann. Log. Symp., New Orleans, La., Paper DD; each of which are incorporated by reference.

The corrected total porosity values are also used to distinguish between water saturation and hydrocarbon saturation in the subsurface formations. A key to this process lies in the difference between true formation resistivity, $R_t$, and the resistivity, $R_0$, that would be observed if the formation were filled with brine having the same resistivity as the downhole formation water, $R_w$. There are several resistivity models that could be used to estimate the water-filled resistivity in the Estimate Water-Filled Resistivity Process 56, but only a few are considered "scientifically based". These models generally begin with the observation by Archie that water filled conductivity, $C_0$ ($C_0=1/R_0$) can be considered to be proportional to the total porosity raised to a constant power, m, times the conductivity of the water, $C_w$.

$$C_0 = a\emptyset^m C_w, \quad (7)$$

It was recognized in the 1950's that clays provide an additional conductivity contribution. The first successful general model that included the contribution of clay counterions was the Waxman-Smits equation that models the additional conductivity as equal to the cation exchange capacity per unit pore volume, $Q_v$, times a parameter B which is dependent on temperature and slightly on salinity.

$$C_0 = \emptyset^{m^*}(C_w + BQ_v) \quad (8)$$

This model has been expanded to more completely include the effects of temperature and saturation. The exponent m* has also been modeled as a square root function of cation exchange capacity times matrix density. Applicants have successfully used an average clay value of 0.1 milliequivalents per gram of clay in demonstrating the feasibility of the inventive method and apparatus. The conductivity models that may be used in connection with the invention include the Waxman-Smits-Thomas, Clavier-Coates-Dumanoir, Waxman-Smits-Gravestock, and Sen-Goode-Sibbit conductivity models. The following references, each of which are incorporated by reference, discuss these procedures and variants thereto in detail:

Archie, G. E., 1942, The electrical resistivity log as an aid in determining some reservoir characteristics, Trans. AIME, 146, 54–61;

Waxman, M. H. and Smits, L. J. M., 1968, Electrical conduction in oil bearing shaly sands, SPE J., 8, 107–122;

Waxman, M. H. and Thomas, E. C., 1974, Electrical conductivities in shaly sands—I. The relation between hydrocarbon saturation and resistivity index; II—The temperature coefficient of electrical resistivity, J. Pet. Tech. Trans AIME, 257, 213–255;

Clavier, C., Coates, G. and Dumanoir, J., 1977, The theoretical and experimental bases for the "dual water" model for the interpretation of shaly sands, SPE paper 6859;

Clavier, C., Coates, G. and Dumanoir, J., 1984, Theoretical and experimental bases for the dual-water model for interpretation of shaly sands, SPE J., 24, 153–167;

Worthington, P. F., 1985, Evolution of shaly sand concepts in reservoir evaluation, Log Analyst, 26(1), 23–40;

Sen, P. N., Goode, P. A. and Sibbit, A., 1988, Electrical conduction in clay bearing sandstones at high and low salinities, J. Appl. Phys., 63, 4832–4840;

Sibbit, A., 1988, Electrical conduction in clay bearing sandstones at high and low salinities, J. Appl. Phys., 63, 4832–4840; and Gravestock, D. I., 1991, Behavior of Waxman-Smits parameter 'B' in high Rw, high temperature reservoirs, Log Analyst, 32(5), 596–602.

The estimated water-filled resistivity can then compared to formation resistivity measurements in the Distinguish Water Versus Hydrocarbon Saturation Process 58. If $R_t$ is the observed deep resistivity and $R_0$ is the expected resistivity of the formation filled with brine, then the water saturation $S_w$ can be approximated as $$S_w = (R_0/R_t)^n, \quad (9)$$

where n is referred to as the saturation exponent and is typically assigned a value of 2. The hydrocarbon saturation is computed as the difference between the corrected total porosity and the calculated water saturation. Net pay flags can be set using any combination of subsurface criteria such as corrected total porosity, permeability, hydrocarbon saturation, free water, etc. in Set Net Pay Flags Process 60.

The Determine Drilling Parameters Process 62 can similarly be set using desired wellbore criteria and any combination of subsurface criteria such as corrected total porosity, permeability, hydrocarbon saturation, free water, etc. The determined drilling parameters could be, for instance, changes in drilling direction or determining at what point to stop drilling. The inventive method and apparatus can be used to influence the drilling direction toward more productive intervals based on changes in porosity, permeability, or hydrocarbon/water saturation, or to stop drilling when anticipated hydrocarbon production matches surface facility design or capability.

Figure 3A:
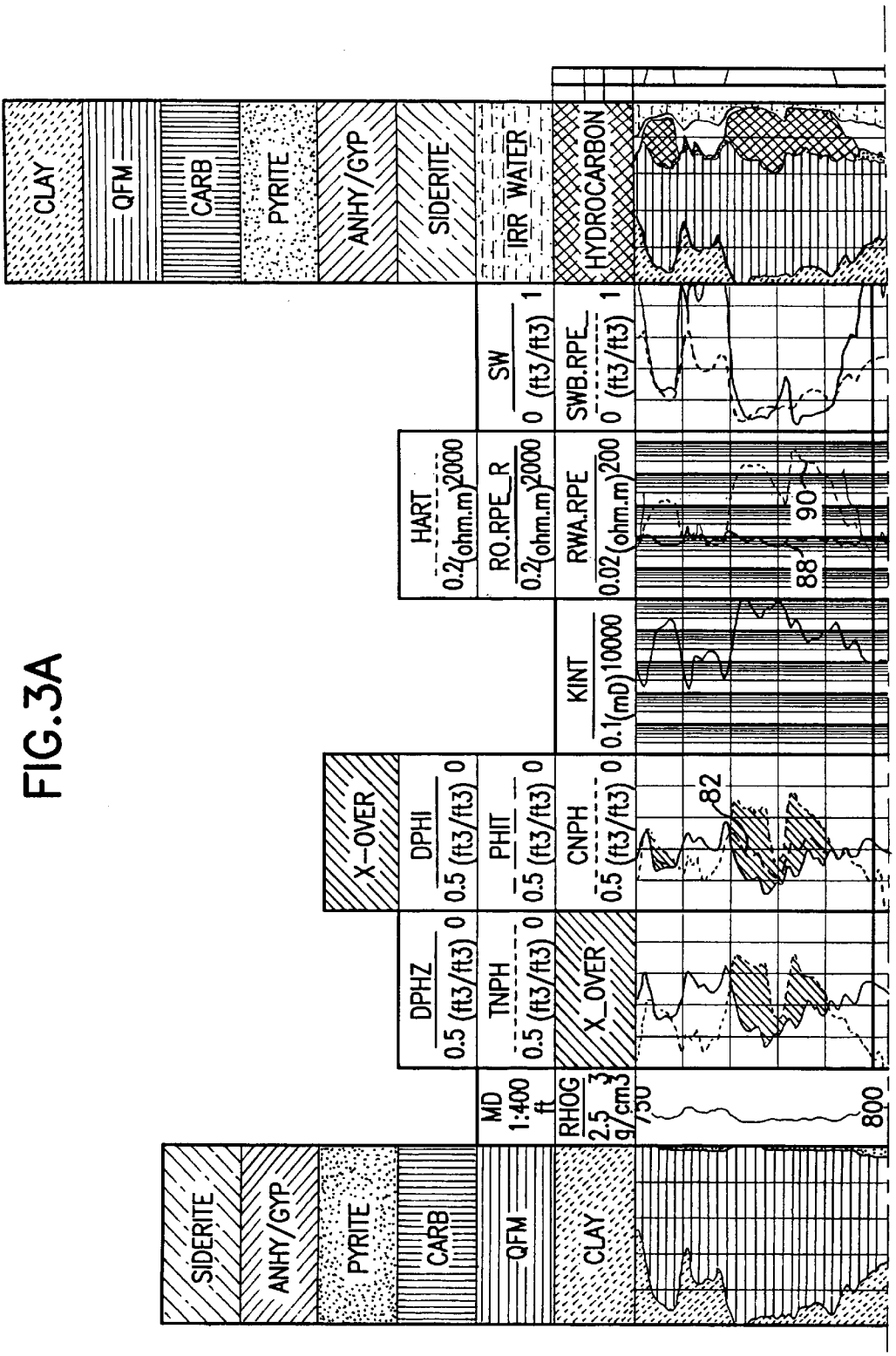
FIG. 3 is an example display showing example output data from certain embodiments of the inventive apparatus and method.
Figure 3B:
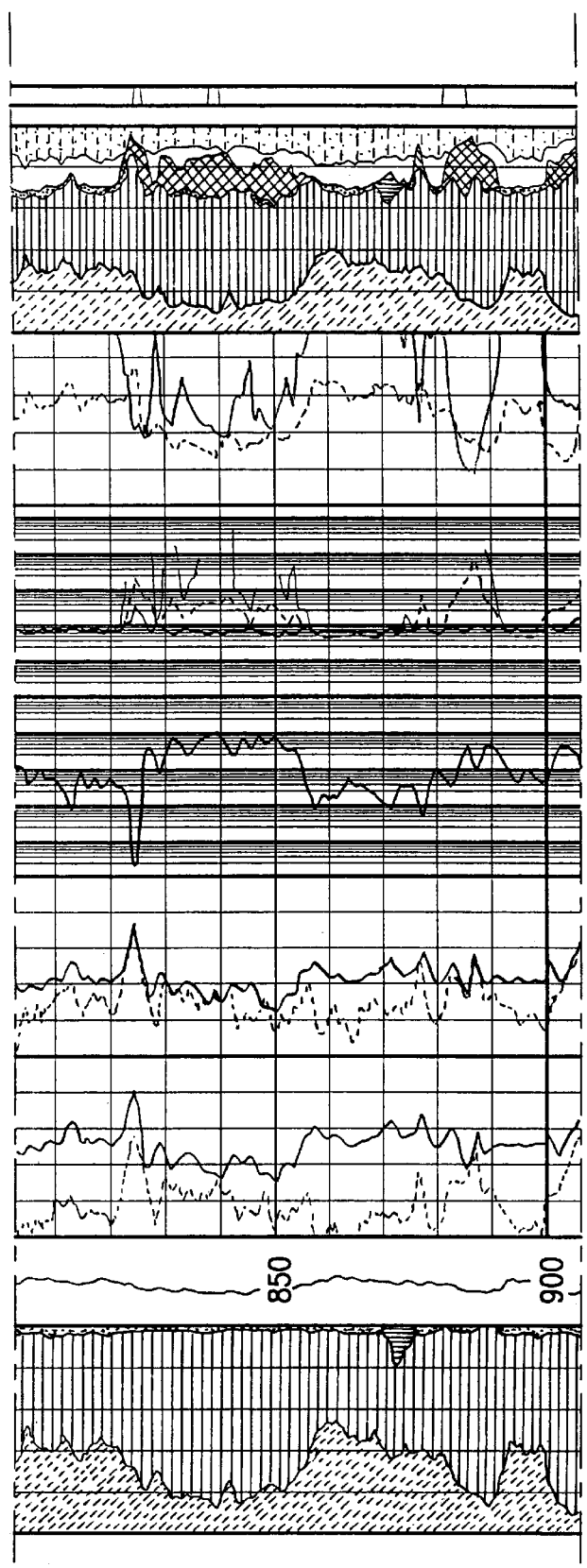
Figures 3, 3C:
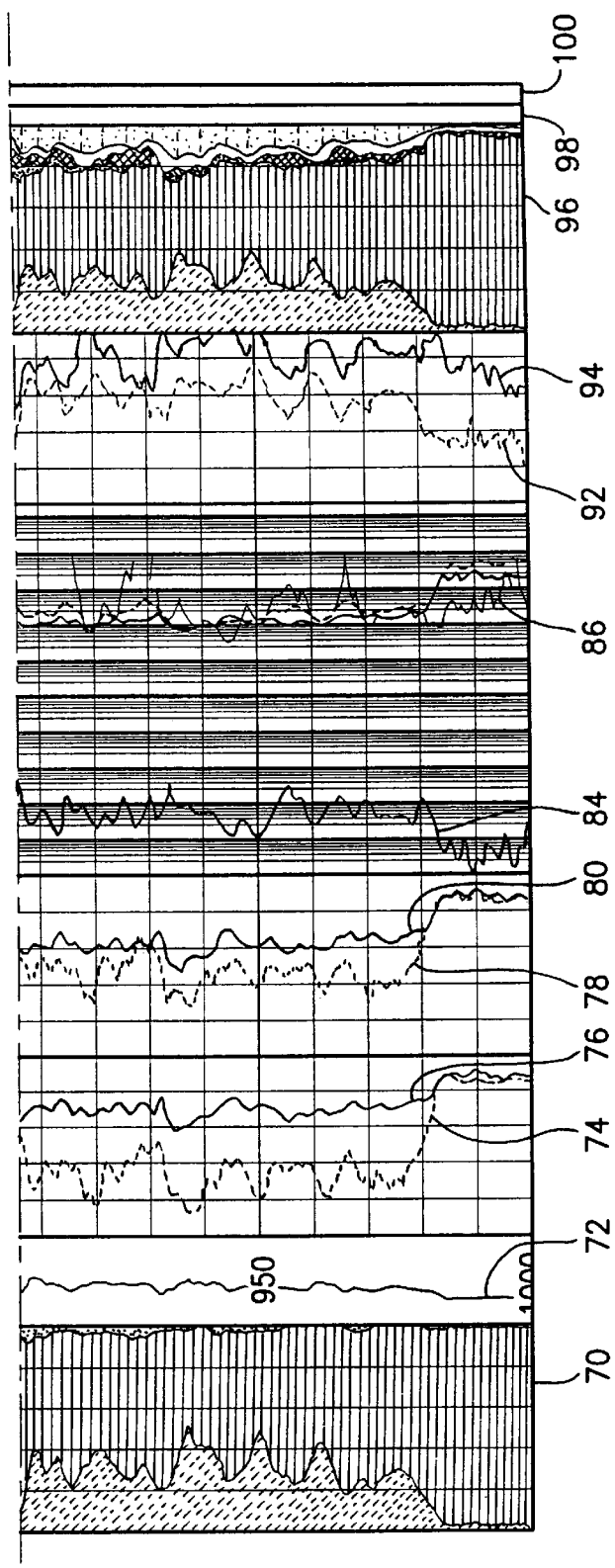

An example display showing the results of the inventive method is shown in FIG. 3. The display consists of ten columns. The first column displays quantitative lithology of the formation matrix. The shading for each component mineral is shown at the top of Matrix Lithology Column 70, and the mineral fractions (by weight) are shown with Clay being presented on the left-most side and the other minerals being displayed in inverse order to their shading code at the top (i.e. any Siderite fraction is displayed on the right-most side of the column). The second column displays the Computed Matrix Density 72 (i.e. the output from the Compute Matrix Density Process 42 discussed above) as well as the measured depth (showing that the interval being displayed represents data obtained from 750 to 1000 feet in depth). This column could also be used to display caliper measurements.

The third column displays conventional density porosity values 74 and neutron porosity values 76. Crossover (where the density porosity values are greater than the neutron porosity values, indicating gas, light hydrocarbon, or depletion) is highlighted with cross-hatched shading. The fourth column displays corrected density porosity values 78, corrected neutron porosity values 80, and total porosity values 82 (i.e. the outputs from the Compute Density Porosity Process 44, the Compute Neutron Porosity Process 48, and the Compute Total Porosity Process 50 discussed above). Crossover is again shown as cross-hatched shading. As discussed above, corrected total porosity values are preferably determined by selecting the corrected density porosity values in the absence of neutron/density cross-over and by averaging the corrected neutron and density porosity values in the presence of neutron/density cross-over.

Column five presents the k-Lambda permeability estimate 84 that was produced by the Calculate Permeability Process 52. Column six shows the estimated water-filled resistivity curve 88, $R_0$, and the measured deep resistivity curve 86, $R_t$. Hydrocarbons are identified when $R_t$ exceeds $R_0$. Also shown are the Computed Resistivity Values 90 for formation water that would have produced estimated formation resistivity values matching the measured formation resistivity values. This column is helpful in confirming that the input water salinity estimate was correct or for automatically selecting proper formation water salinity/resistivity/conductivity values.

Column seven shows the estimate of water saturation 94, $S_w$, and the Coates-Timur-Lambda estimate of irreducible water saturation 92. When $S_w$ is less than one, and it overlays the irreducible water saturation curve, one can expect water-free production. Column 8 shows formation volumetric fractions based on material type. In column 8, clay is shown on the left-most side of the column and irreducible water is displayed on the right-most side of the column. Free water is shown in white and hydrocarbon is shown immediately to the left of the free water. Column 98 may be used to display a Problem flag (such as cases where caliper measurements show that the wellbore is substantially larger than intended, i.e. that the measurement equipment may have difficulty in obtaining proper values, or when the calculated values are inconsistent, for instance when the estimated water saturation 94 is less than the irreducible water saturation 92). Column 100 may be used to display a Net Pay flag. As discussed above, net pay can be determined by selecting any known subsurface criteria such as corrected total porosity, permeability, hydrocarbon saturation, free water, etc. The particular interval acceptance criteria used to set net pay flags in FIG. 3 were: water saturation (SW)<0.4; porosity (CNPH)>0.1; and permeability (KINT)>10 mD. Numerous alternative criteria will be obvious to those of ordinary skill in the art.

This application demonstrates that a simple, robust wellsite petrophysical evaluation system can be produced by adding spectroscopy logs to the traditional triple combo measurements of neutron (or hydrogen index), density and resistivity. These calculations can be made in real time at the wellsite, during playback, or immediately after logging in the decision maker's office. The data could come from wireline or logging-while-drilling (LWD) conveyances.

The inventive method and apparatus have been tested at salinities ranging from 3,000 ppm to 180,000 ppm, essentially the entire oilfield range. The approach appears to be very stable.

The model is primarily a siliciclastic or limestone-bearing formation model. The SpectroLith interpretation can provide a good estimate of total clay and a good estimate of total carbonate. It relies on mineral-based inversion to differentiate calcite from dolomite. This differentiation is used to get the correct matrix density. One approach is to have separate limestone and dolomite models that can be selected if the major lithology is known a priori.

Epithermal hydrogen measurements could also be used in addition to or in place of the thermal neutron measurements described above. Based on core analysis and forward nuclear modeling, it is anticipated that epithermal hydrogen index measurements will offer more predictable results than thermal neutron measurements.

The evaluation requires an input of formation salinity or $R_w$. In most cases, this value is well known. If the value is not known, it is possible to make an initial guess, calculate $R_0$ and compare it to $R_t$ in shales or shaly sands that are likely to be saturated with water. The calculation can be made for an entire well in less than a second, so it is possible to use the results to iterate on a best guess for salinity. The process of iterating to seek the best value can easily be automated.

While separate spectroscopy, density, neutron, and resistivity tools are described, other types of tools may be used, such as the integrated-functionality tools described in commonly assigned U.S. patent application No. 09/860,292, filed May 18, 2001, entitled "Well Logging Apparatus and Method for Measuring Formation Properties", incorporated herein by reference.

Quantitative lithology measurements may be provided by spectroscopy logs such as Schlumberger's ECS™ tool in an openhole wireline environment, Schlumberger's RST™ tool in a casedhole wireline environment, or Schlumberger's xPET™ tool in a logging while drilling environment. Schlumberger's RAB™ or ARC-5™ tools could be used to obtain resistivity measurements while drilling and Schlumberger's ADN™ or CDN™ tools could be used to obtain neutron and density measurements while drilling.

In summary, in a preferred embodiment of the invention, the absolute or relative formation elemental concentration logs from spectroscopy are used to compute matrix density and matrix neutron or matrix hydrogen index, depending on the type of neutron tool used. The resulting matrix adjusted density and neutron porosities converge on true total porosity or, in the case of gas, show enhanced crossover compared to conventional logs. K-Lambda permeability is computed from the quantitative lithology data and the total porosity. A cation exchange capacity log is typically created from the clay fractions assuming a constant cation exchange capacity per mass of clay and this is further converted to a $Q_v$ log using the total porosity. At this point, formation salinity is either input or automatically determined and, from the above data and the measured temperature profile, a log of $R_0$, expected water-filled formation resistivity, is calculated using, for instance, the Waxman-Smits-Thomas conductivity model. Alternative conductivity models that may be used include Waxman-Smits-Gravestock, Clavier-Coates-Dumanoir, and Sen-Goode-Sibbit. When $R_0$ is compared with deep resistivity, the two overlay in water-filled zones such as shales and water-filled sands and shaly sands; hydrocarbon zones are easily recognizable when $R_t$ exceeds $R_0$. The total porosity and k-Lambda are combined in the Coates-Timur-Lambda equation to produce an irreducible water saturation curve, which is overlaid with apparent saturation from the $R_0$–$R_t$ comparison. When $S_w$ matches $S_{wirr}$, water-free production is expected. When $S_w$ is greater than $S_{wirr}$, water is expected. This wellsite petrophysical evaluation can be performed at the wellsite and applies to both wireline logging and logging while drilling measurement conveyances.

Measurements can be made during a single wireline logging pass or while drilling, as discussed above, or at different periods of time. For instance, openhole triple-combo wireline logs may be processed together with later-obtained cased hole spectroscopy wireline logs using the inventive method.

While the invention has been described herein with reference to certain examples and embodiments, it will be evident that various modifications and changes may be made to the embodiments described above without departing from the scope and spirit of the invention as set forth in the claims.

We claim:

1. A subsurface formation petrophysical evaluation method comprising:
   determining formation porosity and permeability using a quantitative indication of formation composition;
   estimating water-filled formation resistivity using said formation porosity;
   associating differences between measured formation resistivity and said estimated water-filled formation resistivity with the presence of subsurface hydrocarbons; and
   estimating irreducible formation water saturation using said formation porosity and said formation permeability.

2. A subsurface formation petrophysical evaluation method according to claim 1, wherein said quantitative indication of formation composition is provided by spectroscopy measurements.

3. A subsurface formation petrophysical evaluation method according to claim 2, wherein formation elemental concentrations derived from said spectroscopy measurements are used to compute formation matrix density.

4. A subsurface formation petrophysical evaluation method according to claim 3, wherein elemental concentrations derived from said spectroscopy measurements are used to compute formation matrix neutron and/or formation matrix hydrogen index.

5. A subsurface formation petrophysical evaluation method according to claim 4, wherein formation porosity is determined by selecting corrected density porosity values in the absence of neutron/density cross-over and by averaging corrected neutron and density porosity values in the presence of neutron/density cross-over.

6. A subsurface formation petrophysical evaluation method according to claim 1, wherein said quantitative indication of formation composition includes an estimate of formation clay fraction.

7. A subsurface formation petrophysical evaluation method according to claim 6, wherein said estimate of formation clay fraction is computed using a plurality of elemental indicators.

8. A subsurface formation petrophysical evaluation method according to claim 1, wherein said water-filled formation resistivity is estimated also using said quantitative indication of formation composition.

9. A subsurface formation petrophysical evaluation method according to claim 1, wherein said determining formation porosity and permeability, estimating water saturated formation resistivity, associating differences between measured formation resistivity and estimated water saturated formation resistivity, and estimating irreducible formation water saturation are performed in real time.

10. A subsurface formation petrophysical evaluation method according to claim 9, wherein said determining formation porosity and permeability, estimating water saturated formation resistivity, associating differences between measured formation resistivity and estimated water saturated formation resistivity, and estimating irreducible formation water saturation are performed at a wellsite.

11. A subsurface formation petrophysical evaluation method according to claim 1, further including acquiring spectroscopy, density, neutron, and resistivity data.

12. A subsurface formation petrophysical evaluation method according to claim 1, wherein said water-filled formation resistivity is determined using one or more of the following conductivity models: Waxman-Smits-Thomas, Clavier-Coates-Dumanoir, Waxman-Smits-Gravestock, and Sen-Goode-Sibbit.

13. Apparatus for petrophysically evaluating a subsurface formation comprising:
   a spectroscopy device,
   a density device,
   a neutron device,
   a resistivity device,
   means for determining formation porosity, permeability, hydrocarbon/water saturation, and irreducible water saturation using measurements from said spectroscopy, density, neutron, and resistivity devices.

* * * * *